United States Patent [19]

May

[11] 4,331,115
[45] May 25, 1982

[54] INTERNAL COMBUSTION ENGINE

[76] Inventor: Michael G. May, Bel Air, CH-1180 Rolle, Switzerland

[21] Appl. No.: 124,889

[22] Filed: Feb. 26, 1980

[30] Foreign Application Priority Data

Apr. 5, 1979 [DE] Fed. Rep. of Germany ....... 2913763

[51] Int. Cl.³ ............................................. F02B 19/16
[52] U.S. Cl. ................................... 123/263; 123/285; 123/661
[58] Field of Search ............... 123/251, 253, 262, 263, 123/269, 285, 289, 290, 301, 661

[56] References Cited

U.S. PATENT DOCUMENTS

| | | | |
|---|---|---|---|
| 2,763,254 | 9/1956 | Klug | 123/661 |
| 3,154,061 | 10/1964 | Henry-Biabaud | 123/661 |
| 4,000,722 | 1/1977 | May | 123/263 |
| 4,094,272 | 6/1978 | May | 123/263 X |
| 4,121,544 | 10/1978 | May | 123/263 X |
| 4,182,280 | 1/1980 | Shekleton | 123/251 X |

FOREIGN PATENT DOCUMENTS

| | | | |
|---|---|---|---|
| 1065660 | 9/1959 | Fed. Rep. of Germany | 123/263 |
| 2542942 | 8/1976 | Fed. Rep. of Germany | 123/263 |
| 387416 | 2/1933 | United Kingdom | 123/253 |

Primary Examiner—Tony M. Argenbright
Attorney, Agent, or Firm—Edwin E. Greigg

[57] ABSTRACT

The invention relates to improvements in a four cycle valve-in-head internal combustion engine, the combustion chamber of which has at least one inlet and one outlet valve each of these valves having plate surfaces which are located at least substantially within the geometric cylindrical surface defined by the piston of the engine. On the one hand, the plate of the outlet valve is positioned in a zone spaced only slightly from the piston when it is the top-dead center position and thereby forms a compression surface area for portions of the charge to be compressed. On the other hand, the plate of the inlet valve is disposed in a portion of the cylinder head which defines the primary clearance volume of the combustion chamber together with the opposed piston top. The cylinder head area for the inlet valve plate includes a depression area to provide for a vortex flow of the compression charge and the arrangement in this area is such that the rotary axis of the vortex flow extends substantially parallel to the longitudinal axis of the inlet valve. Also, the maximum depth of the depression is smaller than the smallest diameter of the opening of the depression oriented toward the piston top or the cylinder head.

13 Claims, 9 Drawing Figures

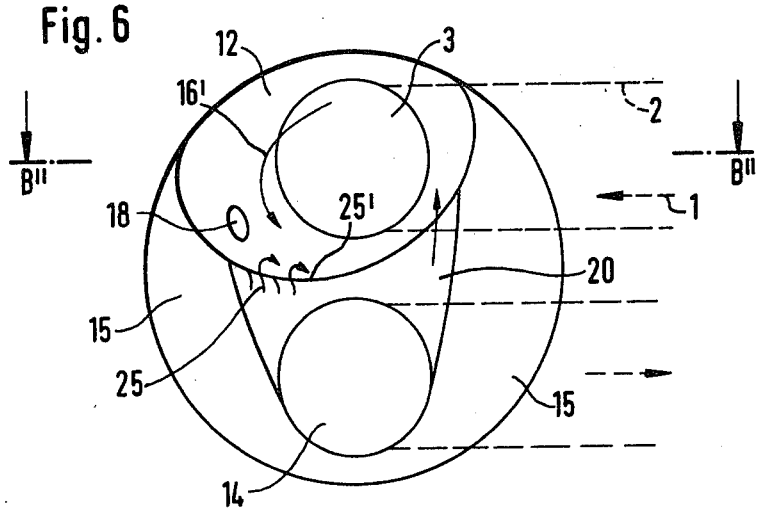
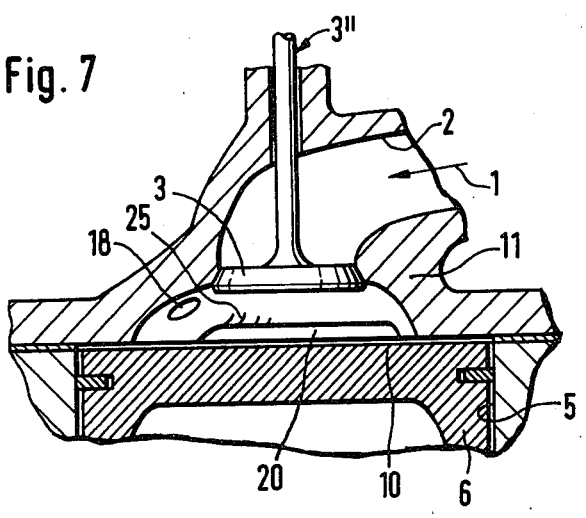

INTERNAL COMBUSTION ENGINE

CROSS-REFERENCE TO RELATED APPLICATIONS

This application discloses subject matter related to applicant's co-pending applications: Ser. No. 143,408, and Ser. No. 143,586, both filed Apr. 25, 1980.

BACKGROUND OF THE INVENTION

The invention relates to four-cycle, piston-type internal combustion engines in which at least two separate valves per cylinder required for the gas exchange are disposed in the cylinder head, in fact in such a fashion that the valve plates are located at least substantially within the geometric cylinder surface defined by the cylinder path.

OBJECTS AND SUMMARY OF THE INVENTION

It is a principal object of the invention to attain a particularly high thermodynamic efficiency on the part of the internal combustion engine by structurally simple means.

This object is attained by the invention disclosed in Claim 1.

The side oriented toward the piston top of the preferably sole outlet valve plate of the cylinder is here located in a portion of the cylinder head which, in the top-dead-center position of the piston associated with this cylinder, extends at a small distance from this piston top surface, which is preferably substantially flat, or entirely or partially slightly curved, and thus, in combination with the piston top, represents a compression or swish or squish zone or a compression area for the gas or charge which is to be compressed. The preferably sole inlet valve, in contrast, is disposed in a second portion of the cylinder head, which either alone or together with the piston top concentrates the main clearance volume of the combustion chamber by means of the depression in which a vortex flow of the primary component of the compressed charge is initiated. The imaginary rotary axis of the vortex flow extends substantially parallel to the longitudinal axis of the inlet valve and the maximum depth of this depression is less than the smallest diameter of the opening of this depression oriented toward the piston top or the cylinder head, and preferably this maximum depth of the depression can be approximately half the diameter of the inlet valve. The engine in accordance with the invention can preferably be an Otto engine which is externally ignited; in particular, it may be an engine such that the fuel is already delivered to the air which is to be induced before the inlet valve.

However, it can also be provided that the fuel is introduced either alone or in combination with an additional air quantity directly into the cylinder, by any one of numerous means which are known per se. The engine according to the invention may advantageously also be a self-igniting engine, that is, a Diesel engine.

A preferable embodiment of the combustion chamber provides that the surface of the fixed inner wall of the depression, that is, of the wall areas which are located between the inlet valve plate and the opening of the depression facing the piston top is so embodied that during the inlet process, or during the suction stroke, a vortex flow is brought about or built up in the cylinder or, if a vortex flow is predetermined by the inlet channel, this vortex flow is reinforced.

To this end, it may be efficiently provided that the opening cross section of that side of the depression in the direction in which the vortex flow is supposed to extend is made wider than the opening cross section of the depression which extends counter to the direction of the vortex flow.

Furthermore, it is preferably provided that the means provided for accelerated ignition of the fuel-air mixture, for example, a spark plug or glow plug, or the like, are disposed in the area of the combustion chamber in which the primary component of the charge is concentrated; that is, these means are provided in the so-called depression. Spark plugs are advantageously disposed in that region which is located nearer the outlet valve and in the region having the largest opening cross section.

A further feature in accordance with the invention is that a channel-like connection, whose depth is substantially smaller than its width, is provided leading to the depression from the area between the outlet valve plate and the piston top. In particular, this channel-like connection of this area may preferably be so embodied in the direction of the depression that a substantially tangential inflow of the charge component compressed out of the squish area occurs into the depression whenever the piston arrives in the vicinity of its top-dead-center position. Here it must be provided that this channel-like connection discharges into that portion of the depression which is opposite the widened opening cross section of the depression or the center of gravity of the opening cross section is displaced from the central axis of the cylinder in the direction of the vortex or rotary flow which is to be initiated.

It may also be provided to this end that the mouth of the channel-like connection into the depression is so embodied that, viewed in the vortex direction, it is relatively sharp-edged and, in the direction counter to the vortex flow, it is more rounded.

It may furthermore be provided that the depression and/or the channel-like connection is embodied entirely or partially in the piston top. However, it is more efficient for many apparent reasons for the side of the piston top surface oriented toward the piston head to have a surface area which is as small as possible, that is, it should preferably be flat or slightly curved.

With the embodiment of the combustion chamber in accordance with the invention of the cylinder or cylinders of a piston-type internal combustion engine, for example, the compression ratio in the externally-ignited, normal Otto engine can be increased by three to five units with the same octane number. Also, particularly lean, preferably homogeneous fuel-air mixtures can be combusted extremely rapidly and without misfiring. As a result, the thermodynamic efficiency is substantially increased, so that approximately 20% lower specific fuel consumption values can be attained in comparison with Otto engines currently being mass-produced. Also, the emission of undesired exhaust gas components from the internal combustion engine is as a result substantially reduced.

In engines in which the fuel is preferably directly injected, that is, where the fuel reaches the combustion chamber only after the inlet valve, as is preferably the case in particular in self-igniting engines, substantially higher combustion levels can be attained, that is, with a given output, the soot component is greatly reduced; or, with the same soot factor, higher average pressures can be realized in comparison with conventional combustion chamber forms.

The invention also has the advantage among others that even during the suction stroke a vortex flow can be built up in the cylinder chamber having the same rotary direction as that in the depression and as a result the vortex flow in the depression can be reinforced and/or can already be built up during the suction stroke.

The invention will be better understood, and further objects and advantages thereof will become more apparent from the ensuing detailed description of preferred embodiments taken in conjunction with the drawings.

BRIEF DESCRIPTION OF THE DRAWINGS

FIGS. 4–9 show three further advantageous exemplary embodiments of the cylinder in accordance with the invention, respectively plan views of the cylinder head oriented toward the piston (FIGS. 4, 6, 8) and partial lengthwise sections through the particular cylinder, viewed along the sectional planes B′—B′ (FIG. 5), B″—B″ (FIG. 7) and C—C (FIG. 9) of FIGS. 4, 6 and 8.

DESCRIPTION OF THE PREFERRED EMBODIMENTS

Figure 1:
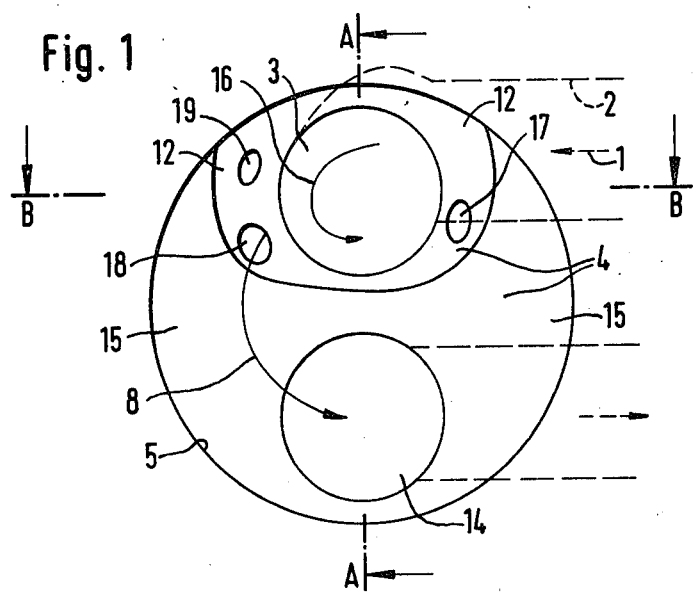
FIG. 1 shows in schematic form one view of a cylinder head in accordance with the invention from the viewpoint of the cylinder bore.

In the drawings the same reference numerals are used for elements which correspond to one another or which can correspond to one another.

Figure 2:
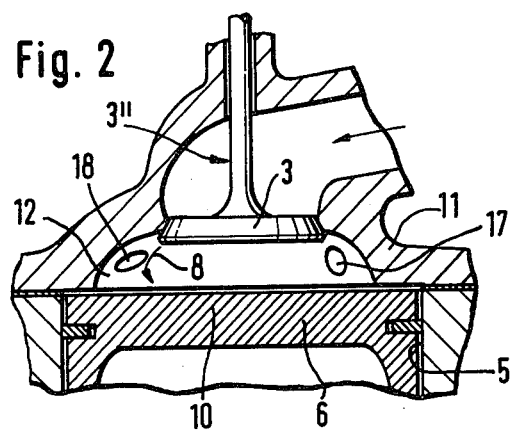
FIG. 2 shows in schematic form a partial lengthwise section of the cylinder having the cylinder head of FIG. 1, taken along the sectional plane B—B of FIG. 1.
Figure 3:
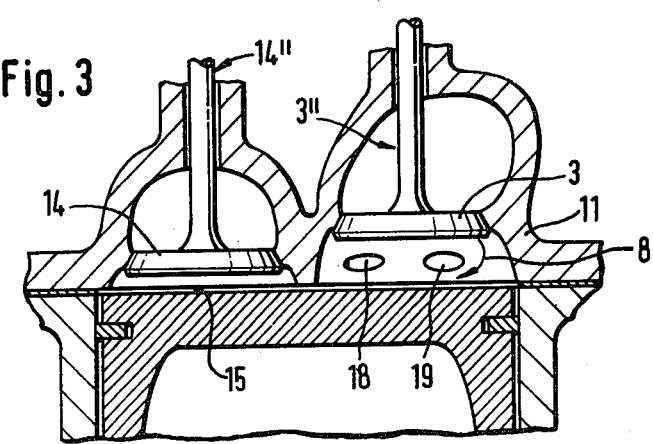
FIG. 3 shows in schematic form a section taken through the same cylinder in the sectional plane A—A of FIG. 1.

In FIG. 1, one embodiment of a cylinder head in accordance with the invention is shown schematically in plan view as seen from the viewpoint of the cylinder bore. FIG. 2 is a partial section of the particular cylinder, viewed along the sectional plane B—B, and FIG. 3 shows an associated sectional view, also in schematic form, taken along the sectional plane A—A. The air which is to be induced, or the fuel-air mixture which is to be induced, proceeds in the direction of the arrow 1 through the intake channel 2 during the suction stroke, that is, when the inlet valve 3″, whose valve plate is designated by reference numeral 3, is opened, and proceeds further into the combustion chamber 4 or into the cylinder chamber adjacent thereto, whose wall is designated by reference numeral 5, which guides the piston 6. As is well known, the induction or suction occurs through the movement of the piston 6 leading away from the cylinder head, this piston 6 being shown in FIGS. 2 and 3. A suction vortex which may be provided, being attainable in numerous ways and by forming or embodying the suction channel guidance in a manner known per se, may be maintained unhindered in the cylinder. In the figures the arrow 8 represents this suction vortex.

Toward the end of the compression stroke, the piston top 10 of the piston 6 approaches the cylinder head 11. Here the predominant portion of the charge, and thus also of the vortex existing therein, is compressed into the depression-like recess of the cylinder head 11 which forms a depression 12, in that the clearance between the piston top 10 and the compression area 15 of the cylinder head 11 surrounding the outlet valve plate 14 of the outlet valve becomes small.

During this time, the rotary or angular velocity of the vortex flow 8 built up during the suction stroke increases as a result of the reduced diameter corresponding to the known vortex law.

The rotary direction of this vortex is maintained in the depression 12 and is represented by the arrow 16.

There are also bores or openings 17, 18, 19 shown in the depression-like indentation 12, which permit the insertion of ignition means such as glow plugs or spark plugs, or the like, and/or delivery means, known per se, for fuel or fuel-air mixtures, such as injection nozzles or valves.

Preferably in externally-ignited engines, particularly when these engines induce a fuel-air mixture, the spark plug is disposed in the area of the depression as indicated at reference numeral 18.

Figure 4:
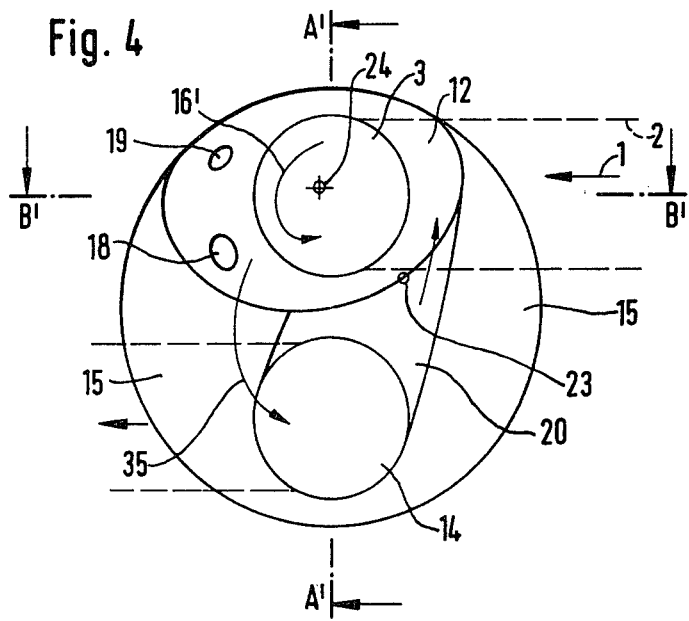
Figure 5:
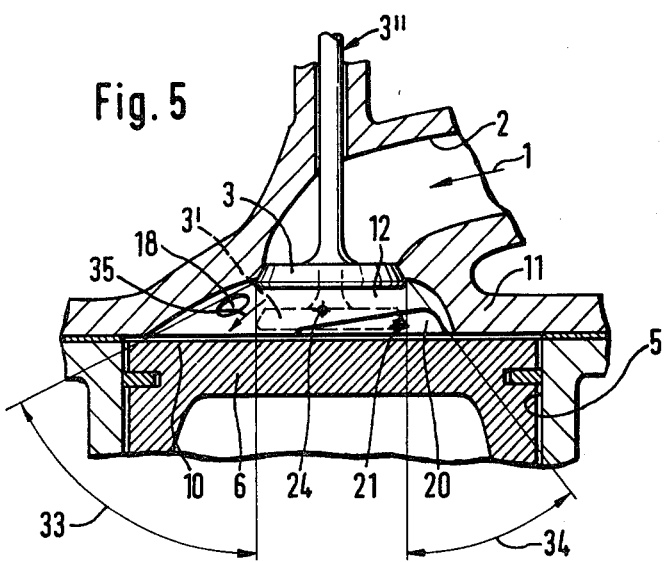

In FIGS. 4 and 5, which represent similar sections to those of FIGS. 1 and 2, a further advantageous embodiment of the combustion chamber in accordance with the invention is shown. It differs from the first example shown in FIG. 1 in that the depression-like combustion chamber portion 12 of the cylinder head 11 has a larger opening angle 33 on the side opposite the inlet channel 2 than on the side of the depression 12 oriented toward the inlet channel 2, where the inflow cross section or opening angle 34 is smaller. As a result of this feature, a rotary or vortex motion on the part of the gas or charge is attained in the cylinder during the suction stroke; or, if a vortex motion of the charge is caused by the form of the suction pipe this vortex flow is reinforced. This effect is shown by the arrow 35, which represents the inflow direction of the greater quantity of the induced charge, so long as the inlet valve is located in an at least partially open position indicated in broken lines at reference numeral 3′. In addition to the above, and independently thereof, a channel-like indentation 20 is provided in the compression or squish zone 15 of the cylinder head, which indentation leads from the area of the outlet valve plate 14 to the said depression 12, which represents the primary component of the clearance volume of the internal combustion engine. This channel 20, which may also be called a guide channel and which can vary its cross-sectional shape in the direction of the depression 12, discharges in the region 23 into the depression 12 and in this region has a cross section whose surface center of gravity 21 is located relative to the volumetric center of gravity 24 of the depression 12 in such a fashion that a substantially tangential inflow of the charge components compressed toward the end of the compression stroke out of the squish zone into the depression 12 is brought about. As a result, a vortex flow is created in the depression 12, or an already existing vortex flow is reinforced.

Figure 8:
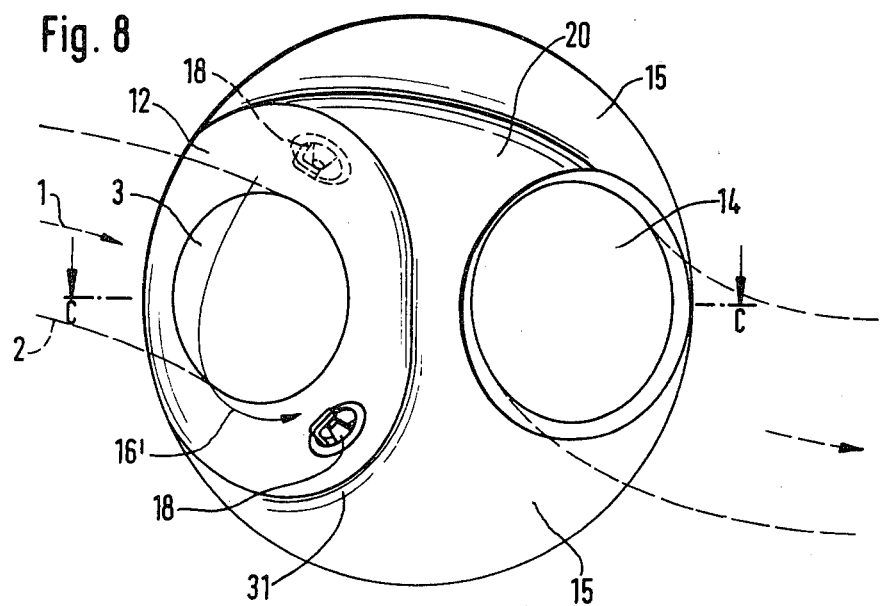
Figure 9:
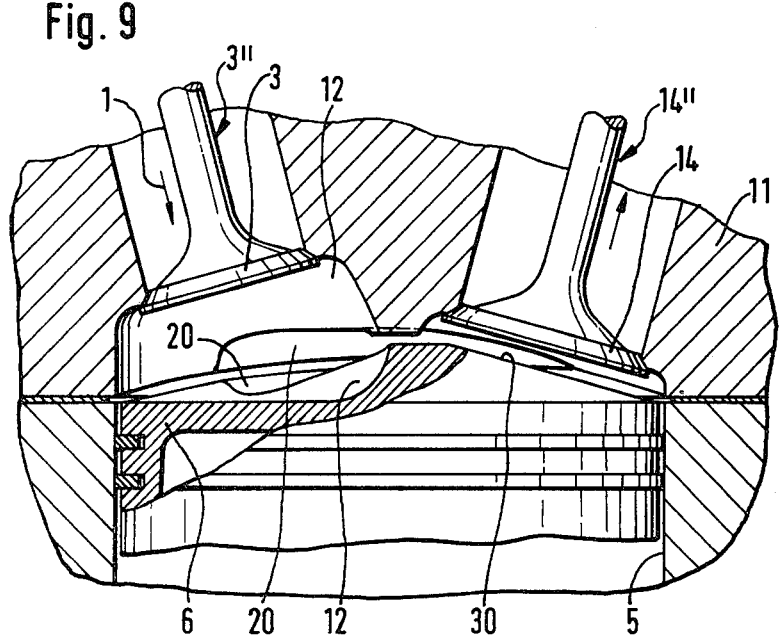

In FIGS. 6 and 7, which are similar to FIGS. 4 and 5, a guide channel 20 is embodied and disposed in such a way that the rim of its mouth, seen in the vortex direction of the vortex flow 16′ arising in the depression 12, is relatively sharp-edged from approximately the point 25′. This is possible without special expense in casting technique. That is, it has a small redius, while in contrast the rest of the rim of the mouth from the point 25′ in the direction counter to the vortex has a substantially larger radius, as is schematically shown by the lines 25. The transition point 25′, as shown, is located in this exemplary embodiment displaced somewhat eccentrically relative to the forward end in the vortex direction on the rim of the mouth. Even with an embodiment of the channel mouth of this kind a motion of the charge in the said vortex direction 16' can be attained, this charge motion being limited but still promoting the spreading out of the flame in the depression. FIGS. 8 and 9 shown an embodiment of the combustion chamber in accordance with the invention, again in plan view (FIG. 8) and in the section taken along the line C—C (FIG. 9) in an engine whose overhead valves 3", 14" are disposed obliquely. The piston 6 has a slightly curved top area 30, which extends at a small distance from the region 15 of the cylinder head 11 surrounding the outlet valve plate 14, when the said piston is in its top-dead-center position.

The guide channel 20 is disposed partially in the cylinder head 11 and partially in the piston top, just as a portion of the combustion chamber portion 12, which is depression-shaped or tub-shaped, is provided only partially in the cylinder head and partially in the corresponding piston top area located therebelow.

The guide channel 20 is partially cut in in the area of the squish zone, and it discharges with relatively sharp edges into the depression-like indentation 12, again on the piston side. In the counter-vortex direction, the squish zone of the cylinder head merges gradually with the depression area 31 of the depression 12.

There are cases in which two ignition means per combustion chamber are desired or prescribed. These are designated with reference numeral 18.

The figures serve solely to explain the principles and guidelines which may be used in constructing the combustion chambers in accordance with the invention either individually or cumulatively in whatever combination is most suitable.

The distance between the compression area 15 of the cylinder head and the surface 10 of the piston top, in the top-dead-center position of the piston, is suitably from 0.6 to 4 mm, preferably 1.2 to 3 mm, and in particular 2 to 2.5 mm, with cylinder diameters which are in the range from 80 to 100 mm, where the larger values apply to cylinder heads made of lightweight metal and the smaller values pertain to cylinder heads made of cast iron. The term depression, recess, indentation and tub-shaped as used within this specification, comprehend the term "depression" or "depression means".

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A four-cycle, overhead valve, piston-type, internal combustion engine comprising:
   a cylinder;
   a cylinder head which is attached to the cylinder and which includes a first portion defining an outlet for discharging combustion gases from the cylinder and a second portion defining an inlet for admitting a charge of air or air-fuel mixture into the cylinder;
   a piston moving reciprocatingly within the cylinder, and defining, with the cylinder and the cylinder head, a combustion chamber of varying geometry which is substantially within the extension of a cylindrical surface defined by the piston path;
   outlet valve means for opening and closing the outlet, including an outlet valve plate which is substantially disposed within the extension of the cylindrical surface defined by the piston path, the outlet valve plate having one side which is oriented toward a first portion of the piston and is located in the first portion of the cylinder head;
   inlet valve means for opening and closing the inlet, including an axis and an inlet valve plate which is substantially disposed within the extension of the cylindrical surface defined by the piston path and is translatable along the valve axis to open or close the inlet, the inlet valve plate being disposed in the second portion of the cylinder head; and
   vortex inducing means for inducing a vortex flow within the combustion chamber of a primary component of the incoming charge in a selected direction about an imaginary axis which extends approximately parallel to the inlet valve axis, the vortex inducing means including the cylinder head second portion, said cylinder head second portion being recessed to define, with a piston second portion, a depression within which the main clearance volume of the cylinder is essentially confined, the depression having a wall which is formed in the cylinder head second portion and extends at least partially radially outward from the cylinder inlet and axially toward the piston to a lateral boundary or rim which extends about and defines, an opening of the depression oriented toward the piston second portion, wherein a first portion of the lateral boundary, towards which the inflowing charge flows in the selected direction of the vortex flow, is disposed at a greater distance from the inlet than is an adjacent second portion of the lateral boundary, to thus induce the primary component of the inflowing charge to flow in the selected direction of the vortex flow.

2. An engine in accordance with claim 1, in which the vortex flow is reinforced by the appropriate disposition and shaping of an inlet channel connected to the cylinder head inlet.

3. An engine in accordance with claim 1, characterized in that from the area between the outlet valve plate and the piston top facing it, a channel-like connection to said depression, open toward the piston top over its entire length, is provided, whose depth is substantially less than its width, and which is so embodied that toward the end of a compression stroke charge components flow into it from the compression area and thus are compressed into the depression in such a manner that the vortex flow in this depression is reinforced, wherein the intended rotary axis of this vortex flow extends substantially approximately parallel to the longitudinal axis of the inlet valve.

4. An engine in accordance with claim 3, characterized in that the rim of the mouth of the channel-like connection in the depression is embodied as being rounded for some distance from the forward end, seen in the vortex flow direction, and then, adjacent thereto, is embodied as relatively sharp-edged up to the rearward end in the vortex flow direction.

5. An engine in accordance with claim 3, characterized in that the channel-like connection effects a generally substantially tangential inflow of the compressed charge component into the depression, in that the geometric surface center of gravity of its mouth cross section at the entrance of the depression is displaced from the central longitudinal axis of the cylinder in the direction of rotary motion of the charge in the depression which is to be induced.

6. An engine in accordance with claim 3, characterized in that the channel-like connection is embodied at least in part in the piston top.

7. An engine in accordance with claim 1, characterized in that the side of the piston top oriented toward the cylinder head has a surface free of depressions, and is generally flat.

8. An engine in accordance with claim 1, characterized in that ignition means for an accelerated ignition of the fuel-air mixture are provided and these act upon the charge generally in the region of the depression.

9. An engine in accordance with claim 8, characterized in that said ignition means include a spark plug which is to be disposed in the region of the depression in which the charge, upon flowing into the combustion chamber, flows in the direction of the vortex flow.

10. An engine in accordance with claim 1, characterized in that it is externally ignited, in particular an engine of this kind with external mixture formation means, such as an Otto engine.

11. An engine in accordance with claim 10, characterized in that it is an engine with internal mixture formation means.

12. An engine in accordance with claim 1, characterized in that it is a Diesel engine.

13. An engine in accordance with claim 1, characterized in that
the depression is also formed at least in the piston top area.

* * * * *